(12) United States Patent
Chang

(10) Patent No.: US 10,503,319 B2
(45) Date of Patent: Dec. 10, 2019

(54) SIGNAL PROCESSING CIRCUIT FOR PROCESSING SENSING SIGNAL FROM TOUCH PANEL

(71) Applicant: Novatek Microelectronics Corp., Hsinchu (TW)

(72) Inventor: Tsen-Wei Chang, Taichung (TW)

(73) Assignee: Novatek Microelectronics Corp., Hsinchu (TW)

( * ) Notice: Subject to any disclaimer, the term of this patent is extended or adjusted under 35 U.S.C. 154(b) by 92 days.

(21) Appl. No.: 15/856,034

(22) Filed: Dec. 27, 2017

(65) Prior Publication Data

US 2019/0196652 A1 Jun. 27, 2019

(51) Int. Cl.
*G06F 3/044* (2006.01)
*G06F 21/32* (2013.01)
*G06F 3/041* (2006.01)
*G06F 3/038* (2013.01)
*G06F 3/047* (2006.01)
*G06F 3/0354* (2013.01)
*H03M 3/00* (2006.01)

(52) U.S. Cl.
CPC ............ *G06F 3/0418* (2013.01); *G06F 3/044* (2013.01); *G06F 3/0416* (2013.01); *G06F 3/038* (2013.01); *G06F 3/03547* (2013.01); *G06F 3/041* (2013.01); *G06F 3/047* (2013.01); *G06F 3/0412* (2013.01); *G06F 3/0414* (2013.01); *G06F 21/32* (2013.01); *G06F 2203/04112* (2013.01); *H03M 3/396* (2013.01); *H03M 3/422* (2013.01); *H03M 3/438* (2013.01); *H03M 3/458* (2013.01)

(58) Field of Classification Search
CPC ...... G06F 3/03547; G06F 3/038; G06F 3/041; G06F 3/044; G06F 3/0412; G06F 3/0414; G06F 3/0416; G06F 3/0418; G06F 3/047; G06F 21/32; G06F 2203/04112; H03M 3/396; H03M 3/422; H03M 3/438; H03M 3/458
See application file for complete search history.

(56) References Cited

U.S. PATENT DOCUMENTS

| | | | | |
|---|---|---|---|---|
| 5,920,309 | A * | 7/1999 | Bisset | G06F 3/044 178/18.06 |
| 8,487,639 | B1 * | 7/2013 | Walsh | G06F 3/044 324/658 |
| 9,690,408 | B1 * | 6/2017 | Krah | G06F 3/0412 |
| 10,296,108 | B2 * | 5/2019 | Gray | G06F 3/03545 |
| 2010/0045310 | A1 * | 2/2010 | Betancourt | G06F 3/044 324/686 |
| 2010/0327882 | A1 * | 12/2010 | Shahparnia | G01D 3/08 324/659 |

(Continued)

*Primary Examiner* — Michael J Eurice
(74) *Attorney, Agent, or Firm* — JCIPRNET

(57) ABSTRACT

A signal processing circuit is provided. The signal processing circuit includes an analog-front-end circuit and a filter circuit. The analog-front-end circuit is configured to receive a sensing signal from a touch panel and perform a signal capture operation on the sensing signal to output a current signal. The filter circuit is coupled to the analog-front-end circuit. The filter circuit is configured to receive the current signal from the analog-front-end circuit and perform a signal filter operation on the current signal to output a first voltage signal. The filter circuit includes an anti-aliasing filter and a comb filter coupled in series.

9 Claims, 3 Drawing Sheets

(56) References Cited

U.S. PATENT DOCUMENTS

| | | | |
|---|---|---|---|
| 2012/0013546 A1* | 1/2012 | Westhues | G06F 3/044 345/173 |
| 2012/0043971 A1* | 2/2012 | Maharyta | G01R 27/2605 324/658 |
| 2012/0092297 A1* | 4/2012 | Han | G06F 3/0416 345/174 |
| 2012/0268142 A1* | 10/2012 | Kremin | G06F 3/0416 324/658 |
| 2013/0021294 A1* | 1/2013 | Maharyta | G06F 3/0416 345/174 |
| 2013/0063395 A1* | 3/2013 | Byun | G06F 3/044 345/174 |
| 2013/0176268 A1* | 7/2013 | Li | G06F 3/044 345/174 |
| 2013/0176269 A1* | 7/2013 | Sobel | G06F 3/044 345/174 |
| 2013/0181942 A1* | 7/2013 | Bulea | G06F 3/044 345/174 |
| 2014/0035601 A1* | 2/2014 | Fujiyoshi | G01R 35/00 324/684 |
| 2014/0062922 A1* | 3/2014 | Tang | G06F 3/0416 345/173 |
| 2014/0292705 A1* | 10/2014 | Tan | G06F 3/0418 345/174 |
| 2015/0054772 A1* | 2/2015 | Jain | G06F 3/0418 345/174 |
| 2015/0084916 A1* | 3/2015 | Han | G06F 3/044 345/174 |
| 2015/0268760 A1* | 9/2015 | Park | G06F 3/044 345/174 |
| 2015/0346862 A1 | 12/2015 | Schwartz | |
| 2016/0026295 A1* | 1/2016 | Ogirko | G06F 3/0416 345/174 |
| 2016/0126972 A1* | 5/2016 | Chang | G06F 3/0416 345/173 |
| 2016/0202809 A1* | 7/2016 | Tang | G06F 3/044 345/174 |
| 2017/0075495 A1 | 3/2017 | Roberson et al. | |
| 2017/0235423 A1* | 8/2017 | Hwang | G06F 3/0418 345/174 |
| 2017/0242502 A1* | 8/2017 | Gray | G06F 3/0346 |
| 2017/0336889 A1* | 11/2017 | Saether | G06F 3/044 |
| 2018/0348954 A1* | 12/2018 | Bohannon | G06F 3/0416 |

* cited by examiner

SIGNAL PROCESSING CIRCUIT FOR PROCESSING SENSING SIGNAL FROM TOUCH PANEL

BACKGROUND OF THE INVENTION

1. Field of the Invention

The invention generally relates to a signal processing circuit, in particular, to a signal processing circuit for processing a sensing signal from a touch panel.

2. Description of Related Art

In this information era, reliance on electronic products is increasing day by day. The electronic products including notebook computers, mobile phones, personal digital assistants (PDAs), digital walkmans, and so on are indispensable in our daily lives. Each of the aforesaid electronic products has an input interface for a user to input his or her command, such that an internal system of each of the electronic product spontaneously runs the command. At this current stage, the most common input interface includes a keyboard and a mouse.

From the user's aspect, it is sometimes rather inconvenient to use the conventional input interface including the keyboard and the mouse. Manufacturers aiming to resolve said issue thus start to equip the electronic products with touch input interfaces, e.g. touch panels, so as to replace the conditional keyboards and mice. At present, the users' commands are frequently given to the electronic products by physical contact or sensing relationship between users' fingers or styluses and the touch input interfaces.

Accordingly, a signal processing circuit for processing a sensing signal from a touch panel is necessary in a touch apparatus.

SUMMARY OF THE INVENTION

Accordingly, the invention is directed to a signal processing circuit for processing a sensing signal from a touch panel.

An exemplary embodiment of the invention provides a signal processing circuit. The signal processing circuit includes an analog-front-end circuit and a filter circuit. The analog-front-end circuit is configured to receive a sensing signal from a touch panel and perform a signal capture operation on the sensing signal to output a current signal. The filter circuit is coupled to the analog-front-end circuit. The filter circuit is configured to receive the current signal from the analog-front-end circuit and perform a signal filter operation on the current signal to output a first voltage signal. The filter circuit includes an anti-aliasing filter and a comb filter coupled in series.

In an exemplary embodiment of the invention, the anti-aliasing filter receives the current signal and provides a preset bandwidth. The anti-aliasing filter filters the current signal based on the preset bandwidth to output a second voltage signal to the comb filter.

In an exemplary embodiment of the invention, the comb filter is coupled to the anti-aliasing filter in series. The comb filter receives the second voltage signal from the anti-aliasing filter. The comb filter operates based on a first operation frequency and filters the second voltage signal to output the first voltage signal.

In an exemplary embodiment of the invention, the signal processing circuit further includes an analog-to-digital converter. The analog-to-digital converter is coupled to the comb filter. The analog-to-digital converter is configured to receive the first voltage signal and convert the first voltage signal of an analog format into the first voltage signal of a digital format based on the first operation frequency.

In an exemplary embodiment of the invention, the signal processing circuit further includes a down-sampling circuit. The down-sampling circuit is coupled to the comb filter. The down-sampling circuit is configured to receive the first voltage signal and perform a down-sampling operation on the first voltage signal to output a third voltage signal.

In an exemplary embodiment of the invention, the signal processing circuit further includes an analog-to-digital converter. The analog-to-digital converter is coupled to the down-sampling circuit. The analog-to-digital converter is configured to receive the third voltage signal and convert the third voltage signal of an analog format into the third voltage signal of a digital format based on a second operation frequency. The second operation frequency is smaller than the first operation frequency.

In an exemplary embodiment of the invention, the analog-front-end circuit includes an operational amplifier circuit and a current mirror circuit. The current mirror circuit mirrors an operational current of the operational amplifier circuit to generate the current signal.

In an exemplary embodiment of the invention, the comb filter is selected from one of a first-order comb filter, a second-order comb filter and a fourth-order comb filter.

In an exemplary embodiment of the invention, the touch panel is selected from one of a self-capacitance touch panel and a mutual-capacitance touch panel.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
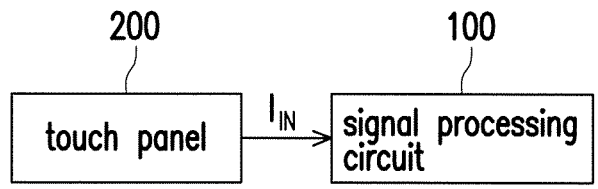
FIG. 1 illustrates a block diagram of a touch sensing apparatus according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments are provided below to describe the disclosure in detail, though the disclosure is not limited to the provided embodiments, and the provided embodiments can be suitably combined. The term "coupling/coupled" used in this specification (including claims) of the application may refer to any direct or indirect connection means. For example, "a first device is coupled to a second device" should be interpreted as "the first device is directly connected to the second device" or "the first device is indirectly connected to the second device through other devices or connection means." In addition, the term "signal" can refer to a current, a voltage, a charge, a temperature, data, electromagnetic wave or any one or multiple signals.

FIG. 1 illustrates a block diagram of a touch sensing apparatus according to an embodiment of the invention. Referring to FIG. 1, the touch sensing apparatus 10 of the present embodiment includes a signal processing circuit 100 and a touch panel 200. In the present embodiment, the touch panel 200 senses a gesture applied thereon and transmits a sensing signal $I_{IN}$ to the signal processing circuit 100. The signal processing circuit 100 receives and processes the sensing signal $I_{IN}$ from touch panel 200 and then transmits a processing result to a next-stage circuit. The processing result may include capacitance variation information of the touch panel 200 due to the gesture.

In the present embodiment, the touch panel 200 may be a self-capacitance touch panel or a mutual-capacitance touch panel, and the invention is not limited thereto. The self-capacitance touch panel may include a plurality of self-capacitance sensors arranged in an array. The mutual-capacitance touch panel may include a plurality of mutual-capacitance sensors arranged in an array. The signal processing circuit 100 may process the sensing signal $I_{IN}$ from a self-capacitance touch panel or a mutual-capacitance touch panel. Enough teaching, suggestion, and implementation illustration for the structure of the touch panel 200 and embodiments thereof may be obtained with reference to common knowledge in the related art.

Figure 2:
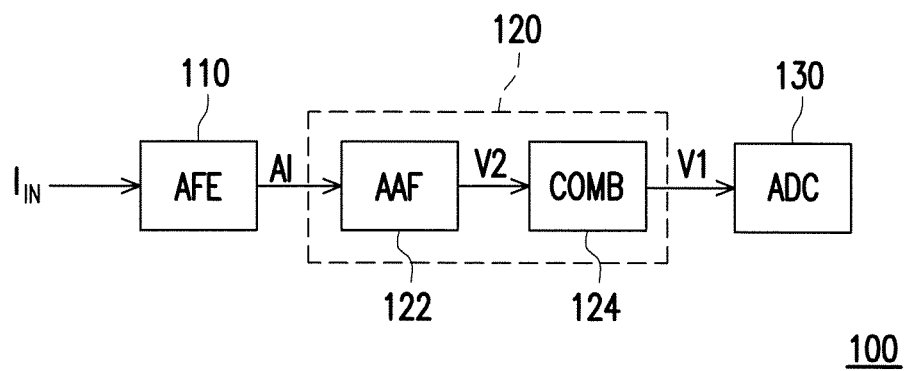
FIG. 2 illustrates a block diagram of the signal processing circuit depicted in FIG. 1.

FIG. 2 illustrates a block diagram of the signal processing circuit depicted in FIG. 1. Referring to FIG. 1 and FIG. 2, the signal processing circuit 100 of the present embodiment includes an analog-front-end (AFE) circuit 110, a filter circuit 120 and an analog-to-digital converter (ADC) 130. The filter circuit 120 is coupled to the analog-front-end circuit 110. The analog-to-digital converter 130 is coupled to the filter circuit 120. In the present embodiment, the filter circuit 120 includes an anti-aliasing filter (AAF) 122 and a comb filter 124. The anti-aliasing filter 122 and the comb filter 124 are coupled in series.

In the present embodiment, the analog-front-end circuit 110 receives the sensing signal $I_{IN}$ from the touch panel 200. The analog-front-end circuit 110 performs a signal capture operation on the sensing signal $I_{IN}$ to capture a main signal of the sensing signal $I_{IN}$ that includes the capacitance variation information. The signal capture operation of the analog-front-end circuit 110 of the present embodiment may be sufficiently taught, suggested, and embodied with reference to common knowledge in the related art, and therefore no further description is provided herein. Next, the analog-front-end circuit 110 outputs a current signal AI related to the main signal to the filter circuit 120. The anti-aliasing filter 122 of the filter circuit 120 receives the current signal AI.

In the present embodiment, the anti-aliasing filter 122 may provide a preset bandwidth to allow the signals located in the preset bandwidth to be passed. In an embodiment, the preset bandwidth may be a bandwidth of zero to one megahertz (0~1 MHz) as illustrated FIG. 5 for example, and the invention is not limited thereto. The anti-aliasing filter 122 filters the current signal AI based on the preset bandwidth to output a voltage signal V2 to the comb filter 124.

The comb filter 124 receives the voltage signal V2 from the anti-aliasing filter 122. The comb filter 124 may operate based on a first operation frequency f1 such as 2.4 MHz and filter the voltage signal V2 to output the voltage signal V1 to the analog-to-digital converter 130. In the present embodiment, the analog-to-digital converter 130 receives the voltage signal V1 and converts the voltage signal V1 of an analog format into the voltage signal V1 of a digital format based on the first operation frequency f1. In an embodiment, the analog-to-digital converter 130 may operate based on a second operation frequency f2 such as 1.2 MHz, and the invention is not limited thereto. The signal converting operation of the analog-to-digital converter 130 of the present embodiment may be sufficiently taught, suggested, and embodied with reference to common knowledge in the related art, and therefore no further description is provided herein.

Figure 3:
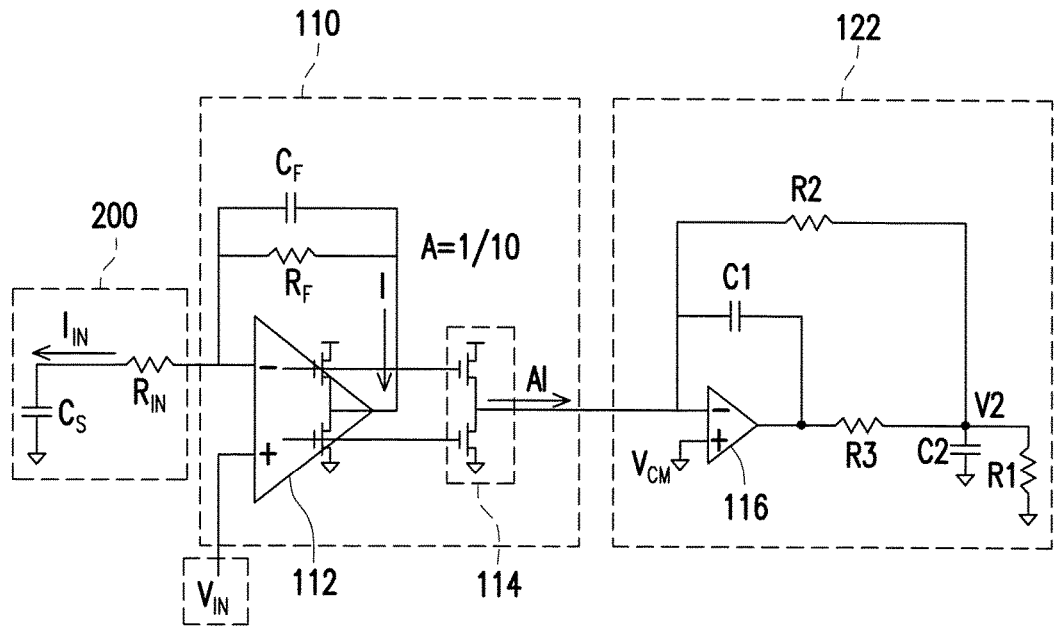
FIG. 3 illustrates a circuit diagram of the analog-front-end circuit and the anti-aliasing filter depicted in FIG. 2.

FIG. 3 illustrates a circuit diagram of the analog-front-end circuit and the anti-aliasing filter depicted in FIG. 2. Referring to FIG. 3, the analog-front-end circuit 110 of the present embodiment includes an operational amplifier circuit 112, a current mirror circuit 114, capacitors $C_S$ and $C_F$ and resistors $R_{IN}$ and $R_F$. The operational amplifier circuit 112 has an inverting end, a non-inverting end and an output end. The inverting end is coupled to one end of the input resistor $R_{IN}$, one end of the feedback resistor $R_F$ and one end of the feedback capacitor $C_F$. The non-inverting end receives an input voltage $V_{IN}$. Another one end of the input resistor $R_{IN}$ is coupled to one end of the sampling capacitor $C_S$. Another one end of the sampling capacitor $C_S$ is coupled to a ground voltage. Another one end of the feedback resistor $R_F$ and another one end of the feedback capacitor $C_F$ are coupled to the output end of the operational amplifier circuit 112.

In the present embodiment, the current mirror circuit 114 is coupled to the operational amplifier circuit 112. The current mirror circuit 114 mirrors an operational current I of the operational amplifier circuit 112 to generate the current signal AI, such that the sensing signal IN is amplified by A times, and the current signal AI serves as an output to be outputted to the anti-aliasing filter 122. The symbol AI includes the current signal I and its coefficient A, and the coefficient A represents a gain of an operational amplifier circuit 112.

In the present embodiment, the anti-aliasing filter 122 of the present embodiment includes an operational amplifier circuit 116, capacitors C1, C2 and C3 and resistors R1, R2 and R3. The operational amplifier circuit 116 has an inverting end, a non-inverting end and an output end. The inverting end is coupled to the current mirror circuit 114, one end of the resistor R2 and one end of the capacitor C1. The non-inverting end is coupled a common mode voltage $V_{CM}$. Another one end of the resistor R2 is coupled to one end of the capacitor C2, one end of the resistor R3 and one end of the resistor R1. Another one end of the capacitor C1 is coupled to the output end of the operational amplifier circuit 116 and another one end of the resistor R3. Another one end of the capacitor C2 and another one end of the resistor R1 are coupled to the ground voltage. The voltage signal V2 is outputted to the comb filter 124.

Figure 4:
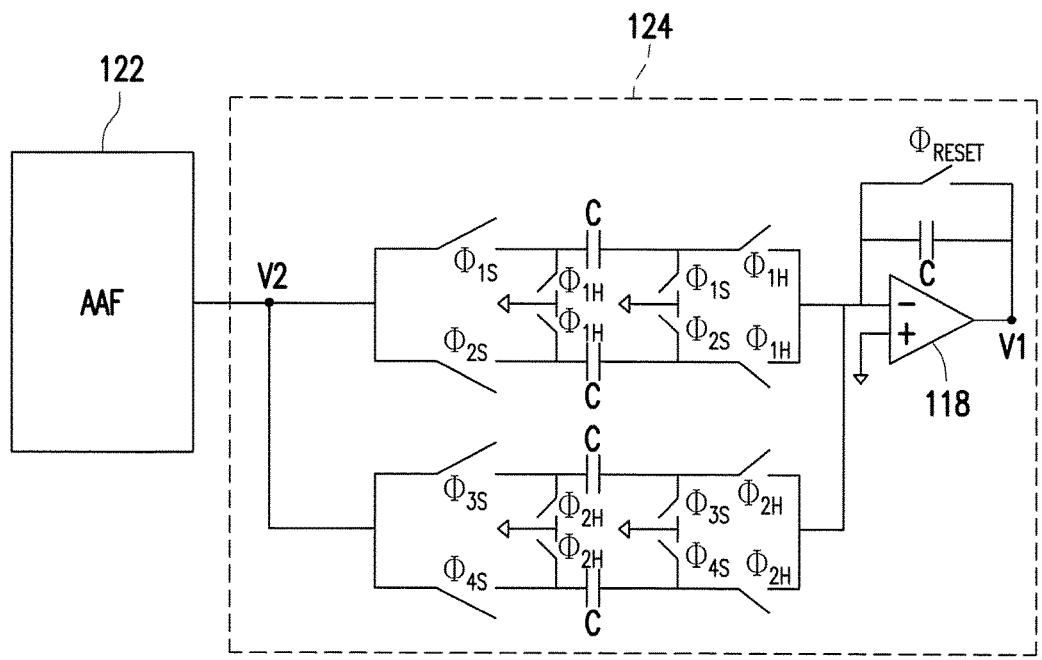
FIG. 4 illustrates a circuit diagram of the comb filter depicted in FIG. 2.

FIG. 4 illustrates a circuit diagram of the comb filter depicted in FIG. 2. Referring to FIG. 4, the comb filter 124 of the present embodiment includes an operational amplifier circuit 118, a plurality of capacitors C and a plurality of switch elements. A plurality of control signals $\Phi_{1S}$, $\Phi_{2S}$, $\Phi_{3S}$, $\Phi_{4S}$, $\Phi_{1H}$, $\Phi_{2H}$, $\Phi_{3H}$, $\Phi_{4H}$, and $\Phi_{RESET}$ are configured to control the corresponding switch elements. The filter operation of the comb filter 124 of the present embodiment may be sufficiently taught, suggested, and embodied with reference to common knowledge in the related art, and therefore no further description is provided herein.

In the present embodiment, the comb filter 124 may be selected from one of a first-order comb filter, a second-order comb filter and a fourth-order comb filter, and the invention is not limited thereto. Herein, the first-order comb filter is exemplarily disclosed in FIG. 4 for the comb filter 124. The circuit structures and the filter operations of the second-order comb filter and the fourth-order comb filter of the present embodiment may be sufficiently taught, suggested, and embodied with reference to common knowledge in the related art, and therefore no further description is provided herein.

Figure 5:
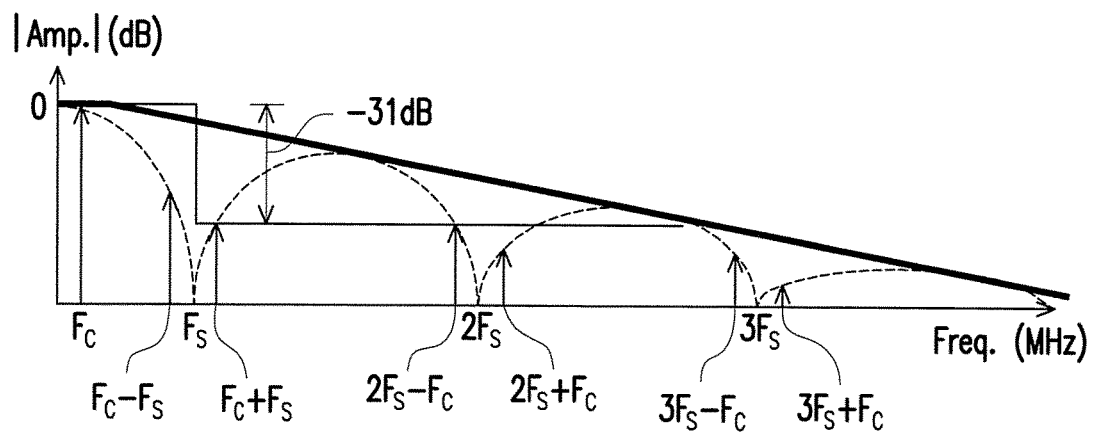
FIG. 5 illustrates a filter bandform diagram of the filter circuit 120 depicted in FIG. 2.

FIG. 5 illustrates a filter bandform diagram of the filter circuit 120 depicted in FIG. 2. The horizontal axis indicates the signal frequency, and the vertical axis indicates the absolute value of the signal amplitude. Referring to FIG. 5, the filter circuit 120 of the present embodiment includes the anti-aliasing filter 122 and the comb filter 124. In the present embodiment, a sampling frequency FS may be set to 1 MHz restrict the bandwidth of the received current signal AI to approximately or completely satisfy the design specification over the band of interest. At frequencies $N \times F_S \pm F_C$, the absolute value of the signal amplitude is set to have 31 dB decay, where N is a natural number and $F_C$ is a central frequency.

Figure 6:
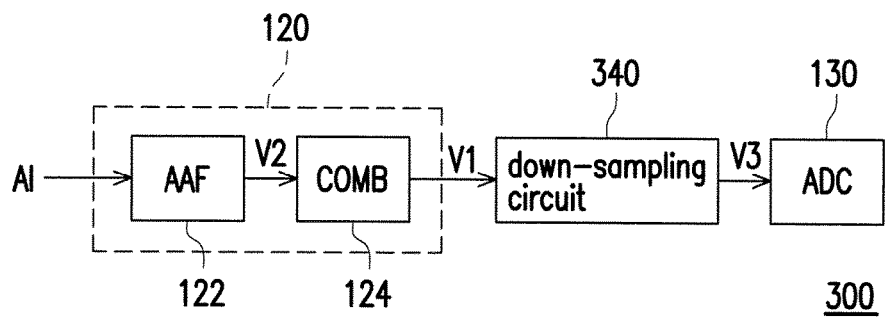
FIG. 6 illustrates a block diagram of the signal processing circuit according to another embodiment of the invention.

FIG. 6 illustrates a block diagram of the signal processing circuit according to another embodiment of the invention. Referring to FIG. 2 and FIG. 6, the signal processing circuit 300 of the present embodiment is similar to the signal processing circuit 100 depicted in FIG. 2, and the main difference therebetween, for example, lies in that the signal processing circuit 300 further includes a down-sampling circuit 340 coupled to the comb filter 124.

To be specific, the down-sampling circuit 340 of the present embodiment is coupled between the comb filter 124 and the analog-to-digital converter 130. The down-sampling circuit 340 receives the voltage signal V1 and performs a down-sampling operation on the voltage signal V1 to output a voltage signal V3 to the analog-to-digital converter 130. The down-sampling operation of the down-sampling circuit 340 of the present embodiment may be sufficiently taught, suggested, and embodied with reference to common knowledge in the related art, and therefore no further description is provided herein.

In the present embodiment, the analog-to-digital converter 130 receives the voltage signal V3 and converts the voltage signal V3 of an analog format into the voltage signal V3 of a digital format based on the second operation frequency f2 such as 1.2 MHz. In the present embodiment, the comb filter 124 may operate based on the first operation frequency f1 such as 2.4 MHz. Due to the down-sampling operation, the second operation frequency f2 of the analog-to-digital converter 130 is reduced. Accordingly, the circuit design of the analog-to-digital converter 130 may be simplified, and the cost is reduced.

In summary, in the exemplary embodiments of the invention, the signal processing circuit may process the sensing signal from the self-capacitance touch panel or the mutual-capacitance touch panel. The analog-front-end circuit may output the current signal to the filter circuit via the current mirror so as to reduce a complexity of a transfer function of the sensing signal. The filter circuit may process the current signal include the anti-aliasing filter and the comb filter. The combination of the anti-aliasing filter and the comb filter may reduce the circuit area for capacitor design in the anti-aliasing filter. In addition, the signal processing circuit may further include the down-sampling circuit to process the output of the comb filter, such that the circuit design of the analog-to-digital converter may be simplified.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A signal processing circuit comprising:
   an analog-front-end circuit configured to receive a sensing signal from a touch panel, perform a signal capture operation on the sensing signal to output a current signal; and
   a filter circuit coupled to the analog-front-end circuit and configured to receive the current signal from the analog-front-end circuit and perform a signal filter operation on the current signal to output a first voltage signal, wherein the filter circuit comprises an anti-aliasing filter and a comb filter coupled in series.

2. The signal processing circuit according to claim 1, wherein the analog-front-end circuit comprises an operational amplifier circuit and a current mirror circuit, and the current mirror circuit mirrors an operational current of the operational amplifier circuit to generate the current signal.

3. The signal processing circuit according to claim 1, wherein the comb filter is selected from one of a first-order comb filter, a second-order comb filter and a fourth-order comb filter.

4. The signal processing circuit according to claim 1, wherein the touch panel is selected from one of a self-capacitance touch panel and a mutual-capacitance touch panel.

5. The signal processing circuit according to claim 1, wherein the anti-aliasing filter receives the current signal and provides a preset bandwidth, and the anti-aliasing filter filters the current signal based on the preset bandwidth to output a second voltage signal to the comb filter.

6. The signal processing circuit according to claim 5, wherein the comb filter is coupled to the anti-aliasing filter in series and receives the second voltage signal from the anti-aliasing filter, and the comb filter operates based on a first operation frequency and filters the second voltage signal to output the first voltage signal.

7. The signal processing circuit according to claim 6, further comprising:
   an analog-to-digital converter coupled to the comb filter and configured to receive the first voltage signal and convert the first voltage signal of an analog format into the first voltage signal of a digital format based on the first operation frequency.

8. The signal processing circuit according to claim 6, further comprising:
   a down-sampling circuit coupled to the comb filter and configured to receive the first voltage signal and perform a down-sampling operation on the first voltage signal to output a third voltage signal.

9. The signal processing circuit according to claim 8, further comprising:
   an analog-to-digital converter coupled to the down-sampling circuit and configured to receive the third voltage signal and convert the third voltage signal of an analog format into the third voltage signal of a digital format based on a second operation frequency, wherein the second operation frequency is smaller than the first operation frequency.

\* \* \* \* \*